United States Patent [19]

Mikes

[11] Patent Number: 4,850,706
[45] Date of Patent: Jul. 25, 1989

[54] LOW PROFILE SPECTRAL ANALYSIS SYSTEM

[75] Inventor: Thomas Mikes, Acton, Mass.

[73] Assignee: American Holographic, Inc., Littleton, Mass.

[21] Appl. No.: 162,907

[22] Filed: Mar. 2, 1988

[51] Int. Cl.⁴ .............................. G01J 3/18; G01J 3/36
[52] U.S. Cl. ..................................... 356/328; 356/334
[58] Field of Search ......................... 356/305, 328, 334

[56] References Cited

U.S. PATENT DOCUMENTS

| | | | |
|---|---|---|---|
| 3,753,618 | 8/1973 | Haley | 356/334 |
| 4,183,668 | 1/1980 | Lindblom | 356/303 |
| 4,405,199 | 2/1983 | Ogle et al. | 350/96.19 |
| 4,412,744 | 11/1983 | Lee et al. | 356/319 |
| 4,601,036 | 7/1986 | Faxvog et al. | 372/20 |

Primary Examiner—Vincent P. McGraw
Attorney, Agent, or Firm—Weingarten, Schurgin, Gagnebin & Hayes

[57] ABSTRACT

A spectral analysis system which may operate as a spectrograph or monochromator comprises a folded optical path within a housing wherein the optical input is provided on one side and the optical output is provided on an opposite side at a spectral focal field, thereby separating optical and electrical functions. The folded optical path is provided within a vertically extending portion of the housing providing for a narrow profile to the optical instrument and keeping the entrance and exit apertures in-line in close proximity. The grating is caused to operate in a near Littrow condition with a reflecting prism having first and second inclined surfaces which respectively reflect entrance aperture light to said grating and disperse exit aperture light from said grating along paths slightly inclined to the Littrow axis of the grating. The prism surface reflecting light to the spectral focal field may be cylindrically concave to focus the output radiation at different frequencies onto a substantially planar spectral focal field. The grating is operated with the spectral separation occurring in a plane orthogonal to the plane containing the gratings recording points. A tilt adjustment for the grating may employed in order to operate the spectral analysis system as a monochromator.

13 Claims, 3 Drawing Sheets

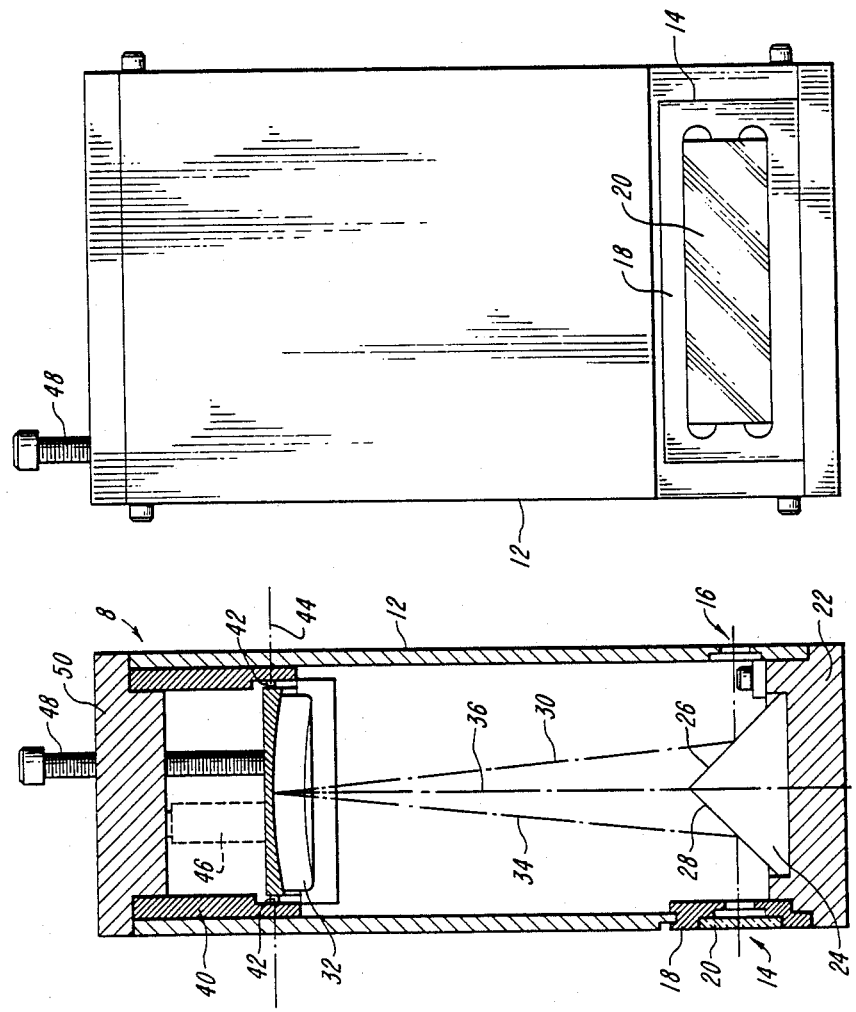

LOW PROFILE SPECTRAL ANALYSIS SYSTEM

FIELD AND BACKGROUND OF THE INVENTION

The present invention relates to optical spectral analysis systems such as spectrographs and monochromators, and more specifically to spectral analysis systems having in-line entrance and exit apertures, a folded optical path comprising a prism and a concave holographic grating and wherein the spectral focal field of the grating is substantially planar over the spectral range of interest.

An instrument that provides an optical separation of light into spectral components is a commonly demanded tool for analytical methodology. Such optical instruments can take the form of spectrographs in which case the light is typically spread spectrally across a photodetector array such an array of diodes with each diode reading the relative intensity of the spectral components in the light for analysis purposes. Alternatively, the instrument can take the form of a monochromator in which a single wavelength or narrow wavelength band is focused at the exit aperture and wherein other wavelengths or bands can be focused thereat by rotating the concave diffraction grating.

Such systems typically find applications in various areas of technology including chemistry, medicine, and physics. As such, the spectral analysis system typically should be placed at an optical output portion of the optical system and an electrical input portion of the electrical or signal processing system. Because of the different demands of the optical and the electrical systems, it is advantageous that their functions be separated and that the spectral analysis system not be of such a configuration as has been true in the past that there fails to exist a clear separation between the optical and the electrical sides.

It is additionally desirable to have an optical instrumentation in which various optical distortions or aberrations are minimized and in which the spectrally separated light is focused at a planar spectral focal field, thereby facilitating the use of planar diode arrays for photo detection.

Compact design and simplicity of operation are also important requirements for such a system allowing it to be easily mounted onto the optical components of the system for precision alignment without intruding the electronics into the optical system itself. Various optical designs for spectrographs, monochromators and other optical analysis instruments exist which fail to achieve some or all of these objectives because of their inefficient optical designs and failure to properly design the spectral separation optics with respect to the remaining spectral instrumentation components.

BRIEF SUMMARY OF THE INVENTION

In accordance with the teaching of the present invention, an optical spectral analysis system is provided in which a housing contains a concave holographic grating in a folded optical path which provides a compact instrument having a minimal separation between the in-line entrance and exit apertures and which places such apertures on opposite housing sides in order to separate the optical and electrical components of the assembly with which the spectral analysis system may advantageously operate.

The system comprises a reflecting prism for directing incident radiation onto the concave holographic grating and for reflecting radiation dispersed by the grating onto a spectral focal field forming the exit aperture. The concave holographic grating is located within the housing remote from and perpendicular to the in-line apertures. The grating is designed for Littrow operation or nearly so and in use oriented to provide near-Littrow reflection of the light. This minimizes distortion and/or the corrective steps necessary to reduce it. Additionally, the grating is oriented so that the plane of the recording points lies orthogonal to the direction of spectral separation further facilitating a compact design for the spectral analysis assembly.

In order to provide optimal light transfer by the reflecting prism without tilting input and output axes, its corner angle is slightly greater than 90° and the grating is typically designed for use slightly off Littrow. Additionally, the reflecting surface of the prism used for directing spectrally separated light from the grating to the exit aperture can be advantageously concave in shape in order to bring the focus points for the different spectral components of the exiting radiation onto a plane surface.

BRIEF DESCRIPTION OF THE DRAWINGS

These and other features of the present invention are more fully set forth below in the exemplary detailed description and accompanying drawings of which:

FIG. 1 is a sectional view of a spectral analysis assembly according to the present invention;

FIG. 2 is an external view of the spectral analysis assembly of FIG. 1;

DETAILED DESCRIPTION

Figure 4:
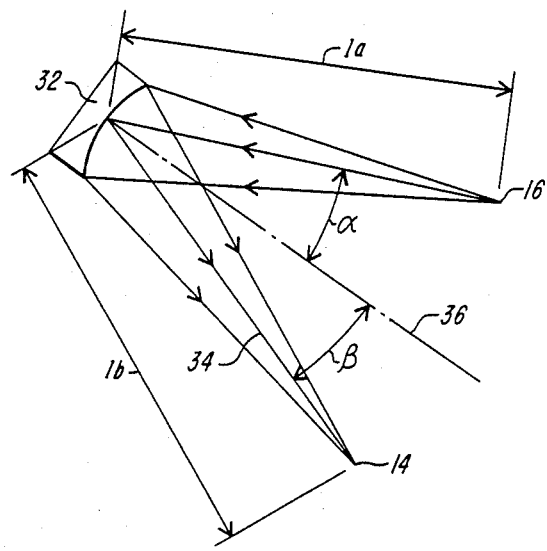
FIG. 4 is an optical diagram in a plane orthogonal to the plane of FIG. 3 useful in understanding the operation of the present invention.

The present invention contemplates a compact spectral analysis system which separates optical and electrical portions of the spectral analysis function to opposite sides of the system and efficiently utilizes space through use of a folded optical path of particular characteristics.

The details of an exemplary embodiment of the invention are most clearly visualized by reference to the figures. As shown in FIGS. 1 and 2 the spectral analysis system 8 comprises a housing 10 having sidewalls 12 forming a vertically extending column and having at lower portions thereof an exit aperture 14 and an entrance aperture 16. As will be appreciated by an examination of FIG. 1, the exit aperture 14 is in-line with the entrance aperture 16, an optical configuration which facilitates efficient packaging of the spectral analysis system 8.

A subassembly 18 including a diode array 20, for example a Hamamatsu #S 2318-38 Q 38 element photodiode array, may typically be secured within the exit aperture 14 so that the spectral analysis system 8 functions as a spectrograph as described hereinbelow. Alternatively, the spectral analysis system 8 may be modified to operate as a monochromator by eliminating the subassembly 18, configuring the exit aperture 14 as a fixed slit, and effecting certain other modifications as described hereinbelow.

A bottom cap 22 is secured within the bottom portion of the column 12 and serves as a mounting structure for a reflecting prism 24 (or equivalent reflectors). The reflecting prism 24 has first and second reflecting surfaces 26 and 28 functioning respectively to direct entering radiation along an optical path 30 toward a concave holographic grating 32 and to direct radiation dispersed by the grating 32 along an optical path 34 toward the exit aperture 14. An optical axis 36 passes symmetrically through the reflecting prism 24 and the grating 32 and defines the Littrow axis of the grating 32, the axis wherein the angle of incidence of radiation incident upon the grating 32 is equal to the angle of diffraction of radiation dispersed by the grating 32. These will be close to 90° for purposes described below.

The grating 32 is mounted within a sleeve 40 inset within the column 12 proximal the end of the housing 10 opposite the bottom cap 22. The sleeve 40 contains pivots 42 which support the concave holographic grating 32 for rotation about an axis 44 defined by the pivots 42. A spring assembly 46 biases the grating 32 with respect to the pivot axis 44. An adjustable screw 48 coacts with the grating 32 for rotation thereof about the axis 44.

The adjustable screw 48 and the spring assembly 46 in combination permit adjustment of a tilt angle of the holographic grating 32 about the axis 44 for initial system alignment and calibration. For monochromator operation the combination rotates the grating 32 about the axis 44 such that desired wavelengths of radiation are focused in the plane of the exit aperture 14. The screw 48 is threaded through an end cap 50 upon which the spring 46 bears. The end cap 50 includes an annular shoulder which engages the sleeve 40 inset within the column 12.

Figure 3:
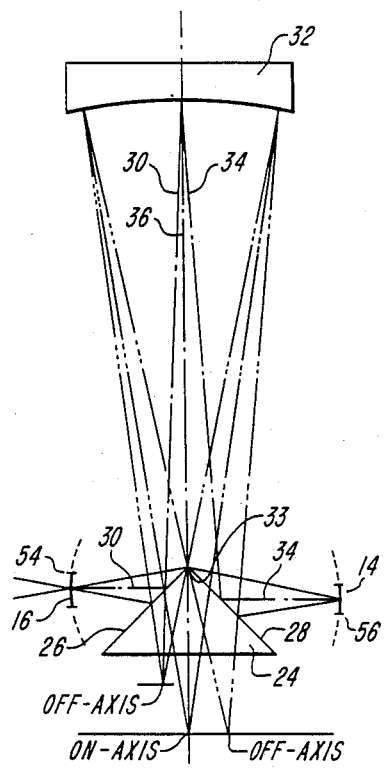
FIG. 3 is an optical focus diagram useful in illustrating the present invention.

With reference to FIG. 3 an optical diagram is provided illustrating the folded optical path of the present invention. As shown, incident radiation passes through the entrance aperture 16, coincident with sample light focal point 54, and is reflected by the first reflecting surface 26 of the prism 24 onto the concave holographic grating 32. The radiation dispersed by the grating 32 is reflected by the second reflecting surface 28 of the prism 24 to focus at a spectral focal field 56 which is coincident with the exit aperture 14.

A central ray traversing optical path 30 of FIG. 3 impinges on the grating 32 at the optical axis 36 and is dispersed along the optical path 34. The central ray defines an on-axis optical path comprised of the optical path 30 which defines a focal length or distance $l_a$ and the optical path 34 which defines a focal length or distance $l_b$. The optical path of the central ray corresponds to exact Littrow operation, that is wherein the angle of incidence (alpha) of optical path 30 with respect to optical axis 36 of the grating 32 is equal to the angle of diffraction (beta) of the optical path 34.

Other rays shown in FIG. 3 are reflected from the first reflecting surface 26 to extremities of the grating 32, dispersed therefrom to the second reflecting surface 28 and reflected therefrom to focus at the spectral focal field 56. These other rays are off-axis with respect to the optical axis 36. Operation of the grating off-axis reduces the introduction of stray light into the spectral analysis system 8, thus optimises the input and output light.

The optical path 34 may be made slightly different, typically longer, than the entrance path 36 or the same depending upon the desire for magnification or not, or the need to control total path length for light transit time requirements dictated by the application.

The prism corner angle exceeds 90° by a magnitude that is twice the deviation of Alpha and Beta from 90° so that nearly all of the input and output radiation is reflected by the surfaces and none lost over the top of the prism 24 while the light entering and exiting stay about the same axis. The nearly in Littrow reflection mode of the grating 32 provides a substantial reduction in distortion, minimal distortion occurring directly within Littrow operation. A typical corner angle 33 is 95°.

In addition, the grating 32 is operated such that the plane of its recording points, as explained below with respect to FIG. 5, typically the plane of the paper is orthogonal to the direction of separation of the radiation along the exit path 34, typically being directed into and out of the page of FIG. 3. In addition, the surface 28 of the prism 24 may be concave, such as cylindrical a spherical, parabolicahyperbolic, in order to cause the spectral focal field 56 at the exit aperture 14 to be a flat focal field, thereby insuring optimal focus along the plane dimension of the diode array 20.

Figure 5:
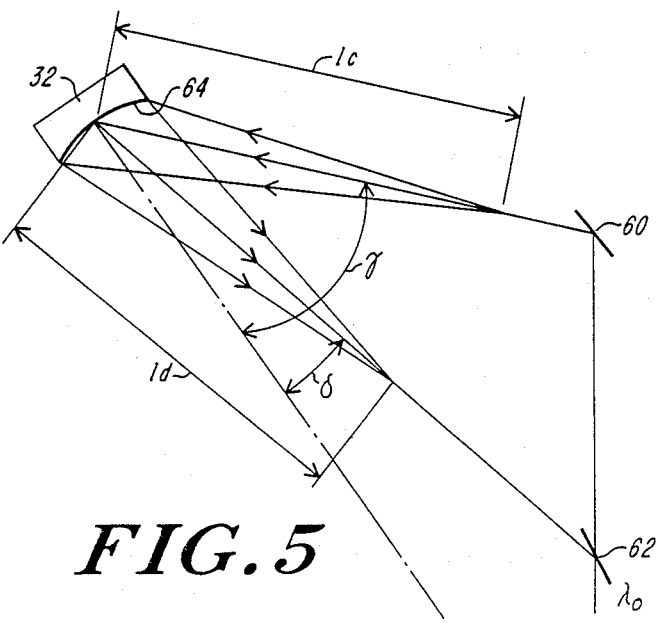
FIG. 5 is an optical in a plane orthogonal to the plane of FIG. 3 design diagram useful in understanding the fabrication of a concave holographic grating for use in the present invention.

The design of the grating 22 to have predetermined optical characteristics for use in the spectral analysis system 8 of the present invention is described with respect to the illustrations of FIGS. 4 and 5 and the following equations:

EQUATION SET A

THE GRATING EQUATION $$Nm\lambda = \sin\alpha \pm \sin\beta$$

SPECTRAL PLANE FOCUS $$\frac{\cos^2\alpha}{l_a} - \frac{\cos\alpha}{R} + \frac{\cos^2\beta}{l_b} - \frac{\cos\beta}{R} - \frac{m\lambda}{\lambda_o} C_f = 0$$

ASTIGMATIC FOCUS $$\frac{1}{l_a} - \frac{\cos\alpha}{R} + \frac{1}{l_b} - \frac{\cos\beta}{R} - \frac{m\lambda}{\lambda_o} C_a = 0$$

COMA TERMS $$\frac{\sin\alpha}{l_a}\left(\frac{\cos^2\alpha}{l_a} - \frac{\cos\alpha}{R}\right) + \frac{\sin\beta}{l_b}\left(\frac{\cos^2\beta}{l_b} - \frac{\cos\beta}{R}\right) - \frac{m\lambda}{\lambda_b} C_c = 0$$

R = Radius of Curvature of Spherical Blank m = The Diffraction Order ($\pm 1$, $\pm 2$, etc.)

EQUATION SET B $$N\lambda_o = \sin\gamma - \sin\delta$$

-continued $$C_f = \frac{\cos^2\gamma}{l_c} - \frac{\cos\gamma}{R} - \left(\frac{\cos^2\delta}{l_d} - \frac{\cos\delta}{R}\right)$$

$$C_a = \frac{1}{l_c} - \frac{\cos\gamma}{R} - \left(\frac{1}{l_d} - \frac{\cos\delta}{R}\right)$$

$$C_c = \frac{\sin\gamma}{l_c}\left(\frac{\cos^2\gamma}{l_c} - \frac{\cos\gamma}{R}\right) - \frac{\sin\delta}{l_d}\left(\frac{\cos^2\delta}{l_d} - \frac{\cos\delta}{R}\right)$$

$\lambda_o$ = The wavelength used in Grating Fabrication wherein:
R = radius of curvature of spherical blank;
$l_a$ = object focal length;
$l_b$ = spectral field focal length;
$l_c$ = first coherent recording point source;
$l_d$ = second coherent recording point source;
m = diffraction order;
(Alpha) = angle of incidence;
(Beta) = angle of diffraction;
(Lambda) = diffracted wavelength;
(Lambda)$_o$ = grating fabrication wavelength;
N = groove frequency;
d = grating period;
$C_f$ = focal plane constant;
$C_a$ = astigmatic constant; and
$C_c$ = coma constant;

Equation Set A and FIG. 4 describe the operating parameters for a concave holographic grating 32 while Equation Set B and FIG. 5 describe the fabrication parameters required to fabricate the grating 32 having the predetermined operating parameters. By way of example only, to illustrate the fabrication of a concave holographic grating for use in the spectral analysis system 8, assume that the spectral range of interest is 300–700 nanometers. The equations of Equation Set A are utilized to equalize, to the greatest degree possible, the values of the focal length, $l_b$, at the 300 and 700 nanometer wavelengths. This generally involves an iterative process with respect to $C_f$ of the Spectral Plane Focus equation.

Equalizing the focal lengths, $l_b$, at the 300 and 700 nanometer wavelengths ensures minimal deviation of the spectral focal field 56 from a planar configuration. Focal fields are never absolutely planar, but may approach optimalization within an acceptable depth of focus, which for a concave grating is approximately equal to two times the product of the entrance aperture width and the grating F/#. $l_a$ is chosen to be the same as $l_b$.

The remaining constants from the equations of Set A, $C_a$ and $C_c$, are selected to minimize astigmatic and coma aberrations over the spectral range of interest, or alternatively at one particular wavelength within the range. Once the constants of Equation Set A have been determined, the four equations of Equation Set B are simultaneously solved to determine the values of the fabrication parameters of Set B, that is, $l_c$, $l_d$, (gamma) and (delta).

The fabrication parameters are used to set up the fabrication arrangement as shown in FIG. 5 wherein laser radiation may be utilized to spatially modulate photoresist materials. As shown in FIG. 5 the grating is fabricated typically using a set of recording points 60 and 62, typically point sources of laser radiation or their equivalent which converge on the surface of the grating 32 after application of a photo sensitive material to the surface 64. The converged beams interference pattern is used to expose the film on surface 64 which is subsequently developed to provide the holographic grating.

The preferred exemplary way of generating a grating according to the present invention, the grating is designed for in Littrow operation in which case Alpha and Beta are both equal, and then operated in a slightly off Littrow environment as illustrated in FIGS. 1 and 3. Given those design parameters and an acceptable astigmatic and coma distortion, and a known wave length, the $C_f$, $C_a$, and $C_c$ terms are known and these in turn, with the known radius of curvature of the spherical blank for the grating 32 will determine the location and angulation of the recording points 60 and 62 of FIG. 5. There results a grating designed for in-Littrow operation which is then operated slightly off Littrow in accordance with the present invention to provide advantages and features described above.

Figure 6:
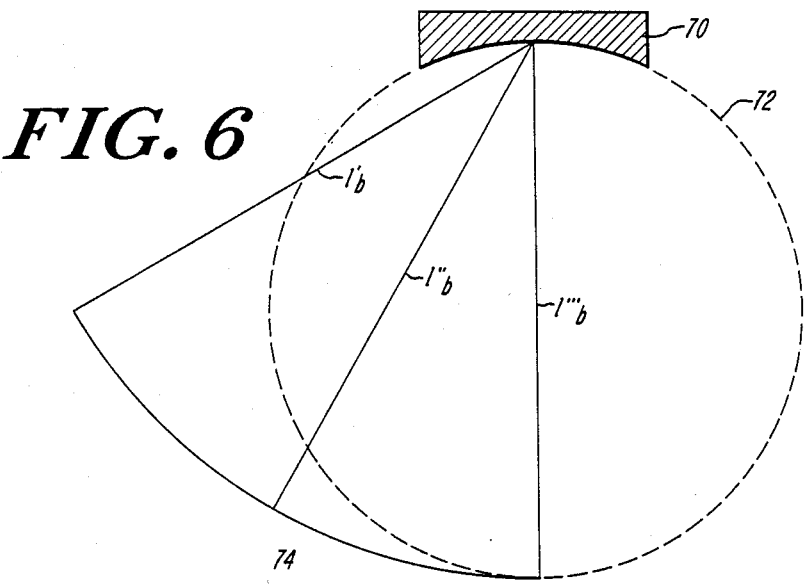
FIG. 6 is an optical diagram in a plane orthogonal to the plane of FIG. 3 useful in understanding the operation of the invention.

In general, the design of a spherical grating departs from traditional Rowland Circle operation as shown in FIG. 6. A grating 70 has an associated Rowland Circle 72 which is the locus of input and exiting beam focal points. For the present application, it is desired not to follow the Rowland Circle as it creates a variation in output path focal distance $l_b$, but instead design for a near constant output focal distance $l_b'$, $l_b''$ and $l_b'''$ across the spectrum. This focal distance locus 74 can then be flattened by a concave prism surface 28 as noted above.

Figure 7A:
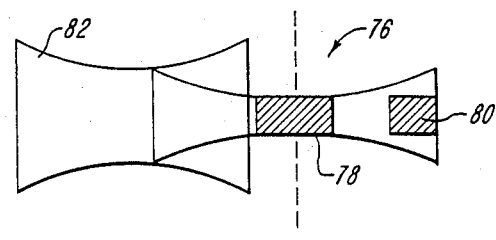
FIGS. 7A and 7B illustrate focussing patterns useful in understanding the invention.
Figure 7B:
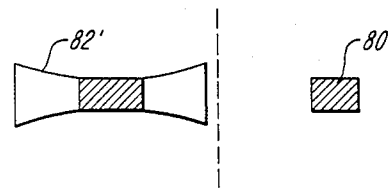

The grating may be designed as a Littrow grating, i.e. output falls along the input path, but used off Littrow as shown in FIG. 7A where pattern 76 represents the image shape of an output beam along the optical axis. In that case, the input beam can be shifted right to position 80 and the output will fall left at position 82, typically 3° each way, but with increased distortion.

Alternatively, the pattern 76 can be shifted by grating design to accommodate slight off Littrow operation yielding a lower off Littrow focus spot 82' for the same off axis input pattern 80. The shape and position of pattern 82 is determined using known ray tracing techniques while the recording points are moved slightly out of the plane of FIG. 5, typically, the same amount in the same direction (equivalent to grating tilt) or unequal amounts and/or directions.

While an exemplary embodiment of the invention has been described above, other forms of the invention may be practiced within the scope of the invention solely as described below in the following claims.

I claim:
1. A spectral analysis system, comprising:
    a housing having an entrance aperture for light to be spectrally analyzed and an exit aperture for a photo detection;
    an optical path within said housing comprising:
    a concave spherical surface section having thereon a holographic grating at a location remote from said entrance and exit apertures;
    means for directing light from said entrance aperture to said grating and from said grating to said exit aperture;
    said grating oriented to operate nearly in Littrow whereby light from and to said entrance and exit aperture travels along substantially the same axis;

said grating adapted to separate light spectrally in a direction orthogonal to said axis.

2. The spectral analysis system of claim 1 wherein said entrance and exit apertures are on opposite sides of said housing.

3. The spectral analysis system of claim 1 wherein said means for directing light from said entrance aperture to said grating and from said grating to said exit aperture includes having first and second surfaces, the first surface thereof inclined at approximately 45° or slightly less to said axis and facing said entrance aperture and said second surface incline at substantially 45° or slightly less to said axis and facing said exit aperture.

4. The spectral analysis system of claim 3 further including means for providing light from said entrance housing having a focal point a predetermined distance optically from said grating;
   said grating focussing the light from said entrance aperture at a predetermined second distance equal to said predetermined first distance at said exit aperture.

5. The spectral analysis system of claim 1 further including a diode array placed in said exit aperture.

6. The spectral analysis system of claim 3 wherein:
   said first and second prism surfaces are located to either side of said axis and wherein said axis represents an axis of Littrow reflection by said grating;
   said prism providing light from said entrance aperture and directing light to said exit aperture to either side of said axis whereby said grating is operated in a near, but not exact Littrow reflection mode.

7. The spectral analysis system of claim 1 further comprising:
   means for tilting said grating about an adjustment axis distinct from said Littrow axis and substantially orthogonal thereto.

8. The spectral analysis system of claim 1 wherein said grating is characterized by a plane of recording points which is orthogonal to a spread of the spectrum produced by said grating.

9. The spectral analysis system of claim 1 wherein said housing includes an elongated column having at one end, and on opposite sides of said column, said entrance and exit apertures and in a location remote from said end, said grating with the distance between entrance and exit apertures substantially smaller than the distance between said grating and either of said entrance and exit apertures.

10. The spectral analysis system of claim 3 wherein said second prism surface is concave in shape so as to cause a focal point for each frequency component in the light reflected by said grating to focus in substantially a flat plane at said exit aperture.

11. The spectral analysis system of claim 1 wherein said grating is characterized by recording points in a plane of a grating central axis for in Littrow operation.

12. The spectral analysis system of claim 2 wherein said grating is characterized by recording points out of a plane of a grating central axis for slight off Littrow operation.

13. The spectral analysis system of claim 1 wherein said light to and from said grating depart from said axis by up to 5°.

* * * * *

UNITED STATES PATENT AND TRADEMARK OFFICE
CERTIFICATE OF CORRECTION

PATENT NO. : 4,850,706
DATED : July 25, 1989
INVENTOR(S) : Thomas Mikes It is certified that error appears in the above-identified patent and that said Letters Patent is hereby corrected as shown below:

In Column 4, line 31, "grating 22" should read --grating 32--.

In Column 4, line 57, "$\frac{m\lambda}{\lambda b}$ $C_c = 0$" should read --$\frac{m\lambda}{\lambda o}$ $C_c = 0$--.

In Column 5, line 34, "parameters. By way" should read
--parameters. ¶By way--.

Signed and Sealed this

Thirtieth Day of June, 1992

*Attest:*

DOUGLAS B. COMER

*Attesting Officer*   *Acting Commissioner of Patents and Trademarks*